Figure 1:
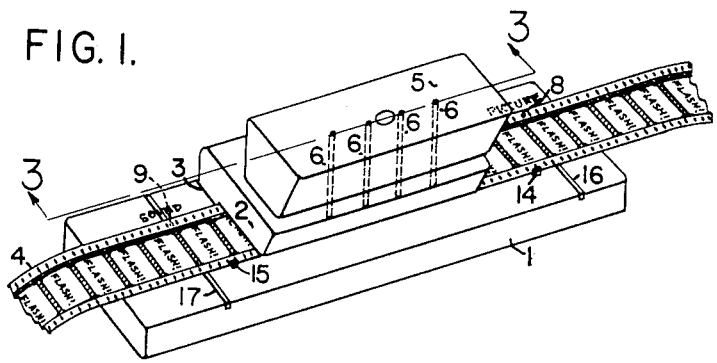

Dec. 27, 1955

W. C. SCHULZ 2,728,394

MOTION PICTURE FILM CUER

Filed April 21, 1955

INVENTOR.
WILLIAM C. SCHULZ

BY Harry R. Lubcke
AGENT

United States Patent Office 2,728,394
Patented Dec. 27, 1955

2,728,394
MOTION PICTURE FILM CUER

William C. Schulz, Pasadena, Calif., assignor to Robert G. Schulz, Van Nuys, Calif.

Application April 21, 1955, Serial No. 502,807

13 Claims. (Cl. 164—90)

My invention relates to means for gang-punching film and particularly motion picture film for the purpose of providing a cue in the process of projection.

Not only in the well-known process of continuous motion picture projection by means of two projectors in theatres but now in the exhibition of motion picture film in television and related arts it is necessary to have cue marks on the film to alert the operator to an impending change and that he be later notified exactly when to make the change. In the exhibition of film via television the need for cue marks has increased many times over that in the theatre. In the latter, cues are usually required only every fifteen or twenty minutes for stopping one projector and starting the other. In television, one each minute or even twenty seconds may be required for commercials for get ready and for change, as well as each fourteen or twenty-eight minutes for most filmed programs.

Furthermore, there is a new function of providing cues for the sound operator, particularly on film inserts on live newsreel shows, so that he may fade down the live microphone during the film sequence and fade it up just prior to resumption of live parts of the program. This prevents unwanted sounds of preparation, etc. from reaching the audience.

The sound cue cannot be located in the same portion of the picture as the picture change cues because the picture operators would then react thereto. In my cuer I provide more than one indexing means so that the picture change cues may be made to appear in the upper right hand corner of the picture and the sound cues in the lower right hand corner, or in equivalent distinguishingly different locations. This is one of the objects of my invention.

Motion picture cues cannot be properly provided by a mark or punch-out in a single frame of film, for this is exhibited for less than one twenty-fourth of a second. Similarly, individually applied marks or punches in successive frames invariably jump around in projection and do not effectively influence the eye of the operator. For this reason I provide a gang punch and proper indexing means so that the cue will accurately appear in the same relative location in successive frames. This is another object of my invention.

It will be understood that a black mark or a clear mark on motion picture film may be reduced in effectiveness by scratches, oil or dirt on the film. However, a small hole in the film gives a cue having a greater brightness than any part of the picture proper and one which cannot be affected as has been described. To provide such an effective cue is another object of my invention.

As will be hereinafter apparent my cuer is small, rugged, portable, easy and quick to operate, is inexpensive to manufacture, and because of a novel aspect of punch construction possesses long life. To provide such an effective device is another object of my invention.

Figure 2:
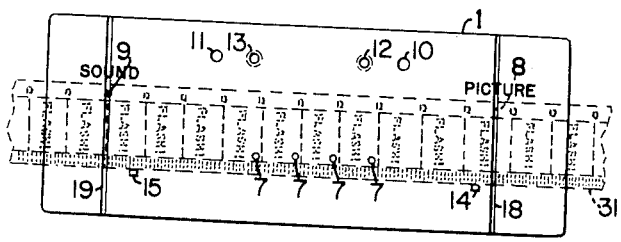
Figure 5:
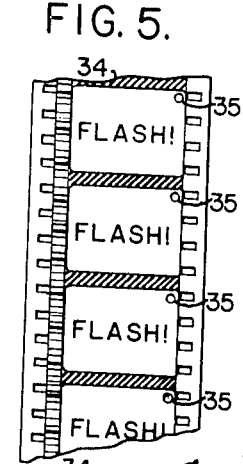
Figure 3:
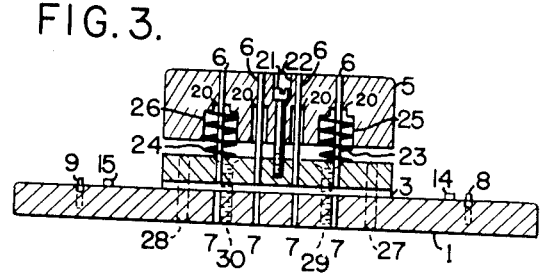
Figure 4:
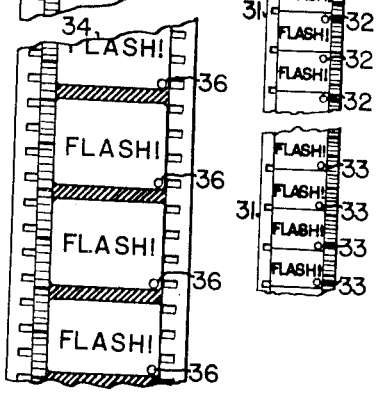

Other objects of this invention will become apparent upon reading the following detailed specification and upon examining the related drawings, in which:

Fig. 1 shows the cuer in perspective with a piece of 35 mm. film in place for making a picture cue, Fig. 2 is a plan view of the base of my device with a piece of 16 mm. film, shown dotted, in place for making a sound cue, Fig. 3 is a sectional elevation of the mechanism of my cuer taken along the line of the punches, 3—3, in Fig. 1, Fig. 4 shows sections of 16 mm. film provided with picture and with sound cues, and Fig. 5 shows sections of 35 mm. film provided with picture and with sound cues according to my invention.

In Fig. 1 numeral 1 identifies the base of my cuer. This also serves as the die, or female portion, of the punch assembly. This is surmounted by the punch guide and stripper 2. The forward lower portion of element 2 is milled out, leaving the rear portion 3, which is attached to base 1 and a slot in which the film to be cued, 4, is positioned. The punch holder is 5, in which a plurality of punches 6 are fastened. As hereinafter described springs hold the punches and punch holder upward from the base and the operator cues the film by pressing down on the punch holder, overcoming the force of the springs and pushing the punches through the film and into the die holes in the base.

My cuer is equally suitable for 35 mm. or 16 mm. film insofar as constructional details are concerned. Since the picture dimension of the 35 mm. film is 2.2 times that of the 16 mm. film the cuer is built in two sizes, the one for 35 mm. film merely being larger than the one for 16 mm. It is not necessary that the sizes of most of the parts bear the same ratio as the film sizes and so my 35 mm. cuer is approximately 1½ times the size of the 16 mm. version.

Passing now to Fig. 2, the arrangement by which either a picture or a sound cue is made with only one cuer may be seen. Fig. 2 shows the die base only, in plan. Holes 7, 7, etc. are those through which punches 6, 6, etc. pass (see Figs. 1 and 3). Pin 8 is registered with a film perforation when a picture cue is to be punched, while pin 9 is used when a sound cue is to be punched. A 35 mm. film is shown registered for picture in Fig. 1 whereas a 16 mm. film is shown dotted as positioned for punching a sound cue in Fig. 2.

In the films of the several figures the word "Flash!" is shown in each frame as would be the case for film exhibiting a title for a flash news event. It is noted that the film is inserted in the cuer so that the wording reads properly from left to right and with the top of each frame to the right as the operator faces the cuer. When a picture cue is required in 16 mm. film a perforation thereof is slipped over index pin 8, and when a sound cue is required another perforation is slipped over pin 9 instead. The latter is the position of the film shown in Fig. 2. The word "Picture" is appropriately stamped into the base near pin 8 and the word "Sound" near pin 9 so that the operator may easily remember which pin he is to use in a particular case.

For indexing 35 mm. film the same procedure is followed, in that index pin 8 on the right side is used for cueing picture and index pin 9 on the left side for cueing sound. Since there are four perforations per frame in 35 mm. film milled slots 16 and 17, which may be ⅟₁₆" wide and deep, are placed on the inside of each index pin 8 and 9 on base 1 in Fig. 1. Aligning the frame bar of 35 mm. film on either one of these milled slots depending upon whether the cue is to be picture or sound assures that the operator will punch the cue in the correct area of the frame. These slots may be filled with black enamel or with a snug fitting piece of copper wire or bar to increase the visual contrast with respect to the metal of the base.

In the same way slots 18 and 19 are provided for 16 mm. film as shown in Fig. 2. With this film only one perforation occurs per frame and this is on the frame line or bar, hence alignment is automatic. It is to be noted that alignment pins are provided on only one side of the film for either sound or silent film and thereby either type may be accommodated.

Further referring to Fig. 2, holes 10 and 11 are for dowel pins as used in machine practice to accurately position stripper 2 with respect to base 1. Similarly, holes 12 and 13 are tapped for flat head screws which fasten the stripper and base together. Numerals 14 and 15 indicate film guide pins. These are positioned so that the film fits snugly between these, the front part of the rear, 3, of the stripper, and the index pin used. The film remains atop pin 9 if pin 8 is used and vice versa.

The mechanical simplicity of my cuer is evidenced by Fig. 3. In that figure it is shown in the non-operated position in front sectional elevation along the line of the punches. The several punches 6, 6, etc. extend vertically from approximately the top of punch holder 5 to the bottom of the milled-out portion of stripper 2. There is a relieved portion 20, 20, etc. around each punch extending more than half way up into the punch holder. The punches are preferably made of music wire and I have found in experimental use of this device in making several thousand cues that the added flexibility afforded the punches in this manner prevents breakage thereof and also insures that the punches will enter the die holes without appreciable wear.

The upward limit of travel of the punch holder is limited by fillister head machine screw 21. This screws into a bottom-tapped hole in the forward part of stripper 2 and fits in the counterbored hole 22 in punch holder 5. The length of the screw is determined in manufacture so that in assembling the cuer the person involved merely drives this screw home and all vertical adjustments are automatically accomplished. This allows disassembly and reassembly by inexperienced persons in the field should some difficulty arise.

Identical compression springs 23 and 24 provide the restoring force to lift the punches out of the way for inserting and removing the film. These are nested in suitable counterbores 25 and 26 surrounding the end punches 6 as shown in Fig. 3. The structure formed by punches 6 sliding in corresponding holes in stripper 2, the fillister head screw 21 sliding in punch holder 5 and springs 23 and 24 results in smooth dynamic performance when the operator operates the cuer by pressing down on the punch holder.

The dowels previously mentioned for holding the stripper and base in proper alignment regardless of disassembly and reassembly during the life of the device are shown dotted at 27 and 28 in Fig. 3. Likewise, flathead machine screws 29 and 30 seat in countersunk holes in the stripper and screw into tapped holes in base 1 for holding these two parts together.

Various materials may be used for constructing the cuer but I prefer aluminum alloy 24ST4 for the die base, the stripper and the punch holder. The punches are preferably of music wire of a size depending upon how prominent the cue marks are to be. I have found #20 gauge satisfactory for 16 mm. film and about 1½ that diameter, or slightly over 1/16 of an inch, for 35 mm. film. The springs may likewise be wound with about seven turns of #20 music wire. Of course, steel, or brass or copper with steel dies in the base may be used, and have been.

In Fig. 4 is shown a piece of 16 mm. film punched with my cuer. In the upper portion of the figure a piece of sound film 31 has been punched with picture cue 32 in the upper right hand corner of four successive frames. This is accomplished by merely inserting the film so that it reads correctly and with the tops of the frames to the right and slipping a perforation over the "picture" index only. In the lower portion of Fig. 4 a sound cue 33 is shown in the lower right hand corner of four successive frames. This was similarly accomplished, but with a perforation engaging the "sound" index pin only.

In Fig. 5 fragmentary portions of a 35 mm. sound film 34 are shown, with picture cue 35 in the upper portion and sound cue 36 in the lower of the separate portions of the film. As has been mentioned these cues were made in a cuer having the spacings concerned with the film proper 2.2 times larger than in the cuer for the 16 mm. film shown in Fig. 4, but with overall and general dimensions 1½ times the 16 mm. cuer.

It is to be understood that a wide variety of positions may be utilized for the cue marks if so desired and that by changing the longitudinal position of an index pin, such as 8 or 9, the cue mark may be moved up or down at the right side of the picture frame. By moving the positions of the punches in manufacture the cue mark may be given any position. It is usual that corners are used for cue marks, to the end that the minimum interference with the enjoyment of the picture by the audience be created. Also, in television, the corners of the image are often cut off by the decorative masks in front of the home receiver screens and then the cues will not be seen at all. In the television station the monitors are not supplied with restrictive masks and so the cues are easily seen by those who must be guided thereby.

A cuer with four individual punches has been shown. This is a preferred number in that the cue is exhibited for one-sixth of a second. However, my device may be made with any number of punches; a reasonable minimum being three and a reasonable maximum being five. Also, the marks may be square, triangular, etc., by giving appropriate shapes to the punches 6, 6, etc. and the corresponding holes in parts 1 and 2.

The cuer may be used in any way satisfactory to the operator, but it is usual to provide a picture alert cue ten seconds before an action is to take place, such as to allow starting another motion picture projector, etc., and another cue two seconds before. This corresponds to 240 frames and 48 frames, respectively, before the end of the film or before any particular point therein which marks the final action. For a sound cue the film is usually cued one second (24 frames) before the announcer is to speak and one second after he finishes. This prevents the audio operator from up-cutting the talk at the beginning and prevents noisy sound at the end.

It is to be understood that instead of the guide pins 14 and 15 other guide projections or a milled slot may be used to properly position the film in cooperation with the indexing means and the rear of stripper 2.

A convenient length for the stripper 2 and punch holder 5 is 1¾" for a 16 mm. cuer and 1½ times this length for a 35 mm. cuer. These and other dimensions have been given in this specification in order to most fully teach how my invention may be practiced. Wide variations may be taken from these dimensions and changes in details, size and proportions may be made without departing from the spirit and domain of the invention.

Having thus fully described my invention and the manner in which it is to be practiced, I claim:

1. A motion picture film cuer comprising a base having a plurality of aligned die holes, a stripper surmounting said base, a punch holder, the same plurality of punches fastened in that portion of said holder away from said stripper with the same alignment as said die holes, plural indexing elements for positioning said film upon said base, one of said elements coactive with said film to cue said film in one location in successive frames and another mutually exclusive element coacting to cue said film in another location in successive frames.

2. A film strip cuer comprising a base having a plurality of linearly aligned die holes, a punch guide fastened to said base and extending above it, a punch holder above said guide, the same plurality of punches fastened in the upper portion of said holder to mate with said die holes, the thickness of said base altered over more than one restricted area to provide indices for positioning said film in said cuer, one of said areas coactive with said film to position said film in one relation to said punches and another of said areas coactive with said film to position said film in another relation to said punches.

3. A film cuer comprising a base having a plurality of aligned die holes, film guide means and plural index pins, a stripper mounted above said base a distance sufficient to allow insertion of a motion picture film to be cued, a reciprocatable punch holder surmounting said stripper, the same plurality of punches as said holes adapted to fit into said die holes, the same plurality of relieved holes so aligned in said punch holder as to cause said punches to enter said die holes, and plural springs for holding said punch holder away from said stripper except when said holder is manually urged theretoward; one of said index pins adapted to position said film for placing cue holes in one position in successive picture frames and another of said index pins adapted to position said film for placing cue holes in a different position in successive picture frames.

4. The film cuer of claim 3 in which said springs are restrained from holding said punch holder away from said stripper an amount greater than that determined by a headed cylindrical piece fastened to said stripper and slidably engaging said holder to a limit determined by a counterbored hole therein engaging said head.

5. One of said plural indexing projections upon said base being adapted to position said film for cue punching at one location in successive frames of said film and another mutually exclusive indexing projection in coaction with said film determining another location with respect to said frames.

6. A manually operated film cuer comprising a base having a plurality of aligned die holes, plural film guides and two indexes, a stripper fastened to said base having a gap therefrom to allow insertion of a motion picture film to be cued therebetween, said stripper having the same plurality of aligned holes as said base, a punch holder adjacent said stripper on the side away from said base, said punch holder having the same plurality of aligned holes as said base, the holes in said holder being counterbored on the side adjacent said stripper, the same plurality of punches rigidly fastened into said aligned holes in said holder, said punches adapted to pass through said aligned holes in said stripper, through said film and into said aligned holes in said base, a plurality less than said prior plurality of compression springs nested between said stripper and said holder to hold these elements apart except when the same are manually urged together, and means to limit the action of said springs; one of said indexes located to coact with sprocket holes in said film to position said film with respect to said punches so that cue holes are similarly positioned in successive picture frames, and the second of said indexes located to coact mutually exclusively with sprocket holes in said film to position said film with respect to said punches so that cue holes are similarly positioned at a location removed from the prior said position in successive picture frames.

7. A manual cueing device for marking motion picture film comprising a base, film guide means upon said base, plural film indexing structures on a part of said base, a plurality of aligned die holes located in said base in relation to said guide means and said indexing structures to lie in the same relative position in successive picture areas of said film, a punch guide and stripper member attached to the top of said base, said member having holes aligned with said die holes, a punch holder surmounting said member and resiliently attached thereto, and the same plurality of punches as die holes rigidly mounted in the top of said holder in the same alignment as said die holes; the recited elements coactive to punch holes in the same relative position in the same plurality of successive picture areas of said film as said die holes upon said film being positioned in said device in relation to said guide means and one of said plural indexing structures when said punch holder is manually pushed downward, and said elements similarly coactive with respect to another relative position in said picture areas when another of said plural indexing structures is used to position said film.

8. A multiple-punch motion picture film cuer comprising a base having a plurality of die holes, said holes aligned and spaced apart a distance equal to the pitch of successive frames of said motion picture film, a punch guide and stripper member mounted above said base a distance sufficient for the insertion of said film between said member and said base, said member having the same plurality of punch guide holes as said die holes in said base and aligned therewith, a punch holder, the same plurality of punches as said die holes in said base, said punches rigidly mounted only at the top ends thereof in said punch holder and aligned and spaced the same as said die holes, said punch holder slidably mounted above said member with said punches passing thereinto, a plurality of springs lesser than the plurality of said die holes interposed between said holder and said member for normally holding the same apart, an element attached to said member slidably engaging said holder for limiting the action of said springs in holding said holder and said member apart, means to laterally align said film upon said base, a projection upon said base to longitudinally align said film for punching holes therein at a corresponding point in successive frame areas upon manually moving said holder toward said base, and another projection differently located upon said base to align said film for punching at another corresponding point in successive frame areas.

9. The film cuer of claim 8 in which a visual index is located adjacent said projections and with which the bars between successive picture frames are aligned for proper cue punching.

10. A manually operated film cuer comprising a base having a plurality of linearly aligned holes, plural film guides and two indexing pins, a punch guide stripper fastened to said base having a gap therefrom to allow insertion of a motion picture film to be cued, said stripper having the same plurality of aligned holes as said base, a punch holder adjacent said stripper on the side away from said base, said punch holder having the same plurality of aligned holes as said base, the holes in said holder being counterbored on the side adjacent said stripper, the same plurality of punches rigidly fastened into said aligned holes in said holder, said punches adapted to pass through said aligned holes in said stripper and into said film and into said aligned holes in said base, two compression springs spaced one from the other and nested between said stripper and said holder to hold these elements apart except when the same are manually urged together, and headed cylindrical means to limit the action of said springs; one of said index pins located to coact with sprocket holes in said film to position said film with respect to said punches so that cue holes are similarly positioned in successive picture frames, and the second of said index pins located to coact with sprocket holes in said film to position said film with respect to said punches so that cue holes are similarly positioned at a location removed from the prior said position in successive picture frames.

11. A multiple punch motion picture film cuer comprising a base having four die holes, said holes linearly aligned and spaced apart a distance equal to the pitch of successive frames of said motion picture film, a punch guide and stripper member rigidly mounted above said base a distance greater than the thickness of said film to allow insertion of the same between said member and said base, said member having four holes aligned with said die holes in said base, a punch holder, four punches, said punches rigidly mounted only at the top ends thereof in said punch holder and aligned and spaced the same as said die holes, said punch holder mounted above said member with said punches passing thereinto, two springs interposed between said holder and said member surrounding the two end punches of said four punches, a fillister head screw attached to said member and slidably engaging a countersunk hole in said holder for limiting the effect of said springs in resiliently positioning said holder and said member apart, two guide pins attached to said base to laterally align said film therewith, an indexing pin upon said base to longitudinally position said film for punching four holes therein at the upper right hand corner in successive picture frames upon manually moving said holder toward said base and another indexing pin for positioning said film for punching at the lower right hand corner in successive picture frames.

12. The cuer of claim 11 in which there are three punches instead of four.

13. The cuer of claim 11 in which there are five punches instead of four.

References Cited in the file of this patent

UNITED STATES PATENTS

| | | |
|---|---|---|
| 1,331,563 | Genter | Feb. 24, 1920 |
| 1,929,518 | Ross | Oct. 10, 1933 |
| 1,953,538 | Mittell | Apr. 3, 1934 |
| 1,962,216 | Schiffl | June 12, 1934 |
| 2,296,136 | Bechtel | Sept. 15, 1942 |
| 2,341,131 | Wales | Feb. 8, 1944 |
| 2,522,187 | Merkur | Sept. 12, 1950 |